Oct. 1, 1968    A. KURTI ET AL    3,403,858
EXHAUST NOZZLE ACTUATION SYSTEM
Filed March 31, 1967
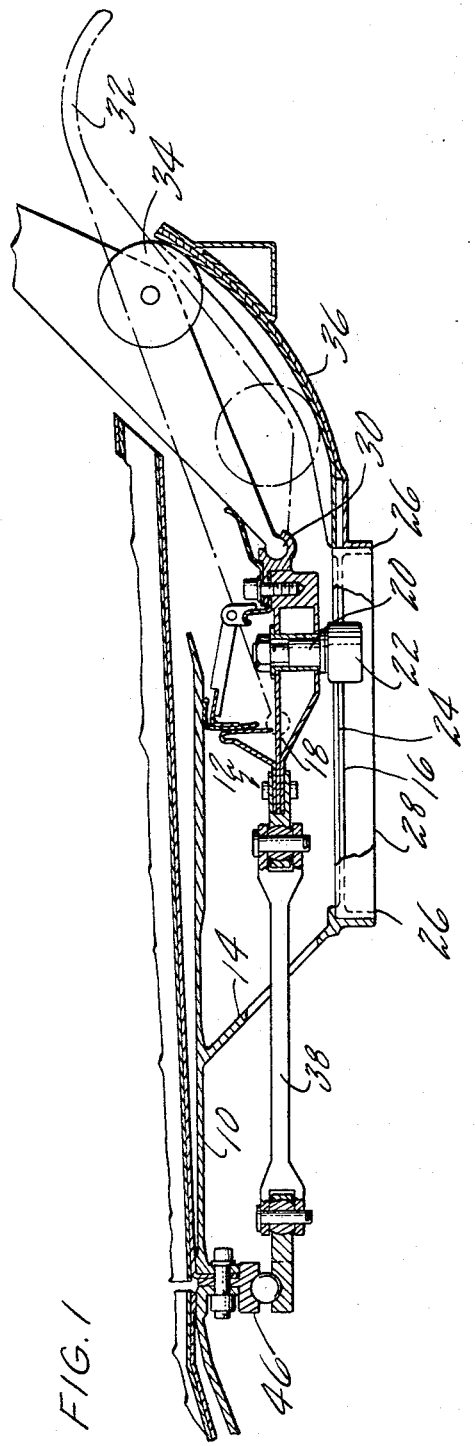
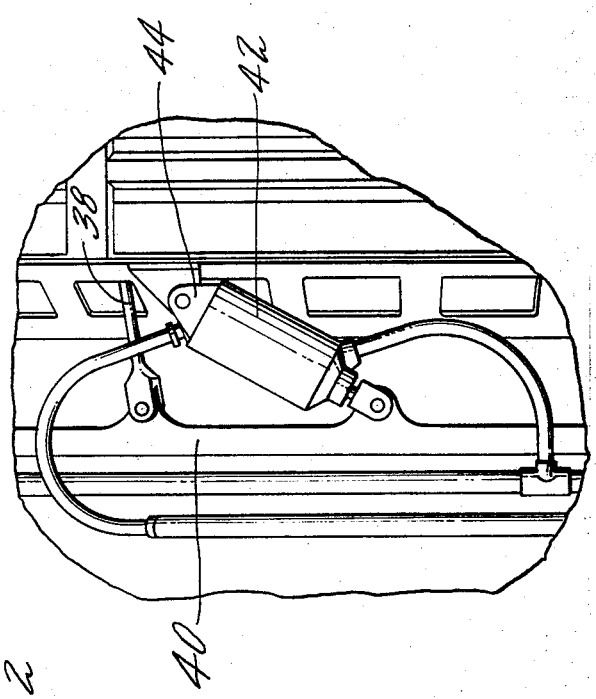
INVENTORS
DONALD E. SHELDON
ALEXANDER KURTI
BY Charles A. Warren
ATTORNEY

United States Patent Office 3,403,858
Patented Oct. 1, 1968

3,403,858
EXHAUST NOZZLE ACTUATION SYSTEM
Alexander Kurti, West Hartford, and Donald E. Sheldon, East Hartford, Conn., assignors to United Aircraft Corporation, East Hartford, Conn., a corporation of Delaware
Filed Mar. 31, 1967, Ser. No. 627,428
4 Claims. (Cl. 239—265.39)

ABSTRACT OF THE DISCLOSURE

A variable area exhaust nozzle for gas turbine engine wherein the actuating mechanism applies a tangential force to a ring causing circumferential movement of the ring, the ring being connected to an axially movable member which causes a flap to translate, thereby varying the area of the exhaust nozzle.

Background of the invention

This invention relates to a variable area nozzle and, more particularly, to a flap-type variable area nozzle adapted for use in a gas turbine engine.

It has been generally recognized by those skilled in the gas turbine art that the operating characteristics of jet propulsion engines may be improved by the provisions of means for varying the area of the jet nozzle. Typical flap-type variable area nozzle constructions contained in the prior art are disclosed in United States Patents 2,699,645, 2,770,944 and 2,974,480. A major disadvantage of the flap-type constructions disclosed by the prior art is the large overall length and radial projection resulting from the method of actuation of the flaps. This, of course, results in a greater weight penalty to the engine.

A second disadvantage of the flap-type variable area nozzle disclosed by the prior art is that if the device should malfunction and become jammed or frozen, all the structural elements will become highly stressed and loaded by the large force generally required to free the device.

Summary of the invention

It is a primary object of this invention to provide a variable exhaust nozzle of shorter length, smaller radial projection and lighter weight.

The present invention relates to a flap-type variable exhaust nozzle wherein a rotatable ring is actuated circumferentially by a tangential force applied by an actuator. This ring is fixed axially and is connected to an axially movable hinge support assembly by a plurality of links. This support assembly is fixed circumferentially and is pivotally connected to a plurality of flaps carried on rollers which translate axially and radially inwardly along fixed roller tracks.

One advantage of the present invention over that of the prior art is that it provides a means of varying the exhaust nozzle area without a substantial increase in radial projection or length. The advantage is achieved by circumferentially actuating an axially restrained ring, the linkage and axially movable mechanism connected thereto then causing flaps to move and vary the area of the exhaust nozzle.

A second advantage of the present invention over the prior art is the complete symmetry of the actuation device which in turn means synchronized action and leads to a lightweight device not likely to be jammed by eccentric loads.

Brief description of the drawing

FIGURE 1 is a fragmentary sectional view of a variable exhaust nozzle showing the device of the invention thereof.

FIGURE 2 is a fragmentary view of the actuator mounting external of the engine.

Description of the preferred embodiment

Referring first to FIGURE 1 for a description of an illustrative embodiment of the invention, engine duct 10 supports a hinge assembly 12, hereinafter described, by outwardly extending flange 14.

Hinge support assembly 12 includes fixed outer shell 16 connected to flange 14, and axially movable inner ring 18. Outer shell 16 and inner ring 18 are connected together by bolts 20, bolts 20 including rollers 22 which are slidable in slots 24 contained in the outer diameter of outer shell 16. Since outer shell 16 is fixed to flange 14, circumferential movement of hinge support assembly 12 is prevented by the connection between outer shell 16 and inner ring 18. Axial movement of hinge support assembly 12 is permitted by the movement of rollers 22 in slots 24. Axial tracks are provided for hinge support assembly 12 by outer shell 16, outwardly extending flanges 26 and circumferential flange 28. These members combine to form a box-type shroud within which rollers 22 cooperate.

Connected to inner ring 18, at its downstream side, by pivots 30 are flaps 32. Mounted on flaps 32 are rollers 34, rollers 34 rolling along fixed roller tracks 36. It should be clear that as inner ring 18 moves axially right, this movement will cause rollers 34 to move axially and radially inward along roller tracks 36 thereby varying the area of the exhaust nozzle.

Connected to the upstream side of inner ring are links 38. Connected to the upstream side of links 38 is rotatable ring 40, best shown in FIGURE 2. Actuator 42 is fixedly mounted on one end to the engine by bracket 44, and is connected to rotatable ring 40 at its other end. Rotatable ring 40 is restrained axially, by thrust bearing 46 for example, so that when an actuating force is applied by actuator 42 rotatable ring 40 is caused to move circumferentially. This then causes links 38 to move in a fore and aft direction causing inner ring 18 to move flaps 32 and rollers 34 along tracks 36.

It is to be understood that the invention is not limited to the specific embodiments herein illustrated and described, but may be used in other ways without departure from its spirit as defined by the following claims.

We claim:
1. A variable area nozzle for a gas turbine engine, including a plurality of flaps spaced circumferentially around the axis of said engine, each of said flaps being movable radially inward or outward with respect to said axis to vary the area of said exhaust nozzle, a roller connected to each of said flaps for causing said flap movement, and fixed roller tracks, each of said rollers and flaps being translatable axially and radially inwardly along said fixed roller track, and an engine duct downstream of said flaps and said fixed roller track, wherein the improvement comprises:
   a rotatable ring;
   means for constraining said rotatable ring axially so as to permit only circumferential movement of said ring;
   an actuator connected to said ring for causing said circumferential movement of said ring;
   a hinge support assembly connected to said duct and supported therefrom, said hinge support assembly pivotally connected at one end to all of said flaps, said hinge support assembly including means for constraining circumferential movement of said hinge support assembly while permitting axial movement of said hinge support assembly; and
   a plurality of links extending between said rotatable ring and said hinge support assembly, circumferential movement of said rotatable ring causing said links to move said hinge support assembly axially and causing said flaps and rollers to translate along said roller track thereby varying the area of said exhaust nozzle.

2. A variable area nozzle as in claim 1 wherein the said means for circumferentially constraining said hinge support assembly is comprised of:

an outer shell fixedly secured to said engine duct and supported therefrom and having an axially extending slot in its outer diameter;

an inner ring spaced radially therefrom and pivotally connected at one end to all of said flaps and at the opposite end to all of said links; and a securing means extending through said outer shell and said inner ring, said securing means including rollers, said rollers cooperating slidably in said slot, the end opposite therefrom being rigidly fixed to said inner ring, so that said inner ring, said securing means, said links and said flaps are axially movable.

3. A construction as in claim 2 wherein:

said outer shell includes at least two outwardly extending circumferentially spaced flanges, said securing means cooperating slidably therebetween, said flanges thereby forming an axial track.

4. A construction as in claim 1 wherein:

said means for constraining said rotatable ring axially is comprised of a ball thrust bearing.

References Cited

UNITED STATES PATENTS

| | | | |
|---|---|---|---|
| 2,780,056 | 2/1957 | Colley | 239—455 X |
| 2,934,892 | 5/1960 | Hurlbert et al | 239—265.39 |
| 3,344,604 | 10/1967 | Mattia et al | 239—265.27 X |

M. HENSON WOOD, JR., *Primary Examiner.*

HOWARD NATTER, *Assistant Examiner.*